April 21, 1925.
J. D. ROSS
SPRINKLER HEAD
Filed July 11, 1922
1,534,546
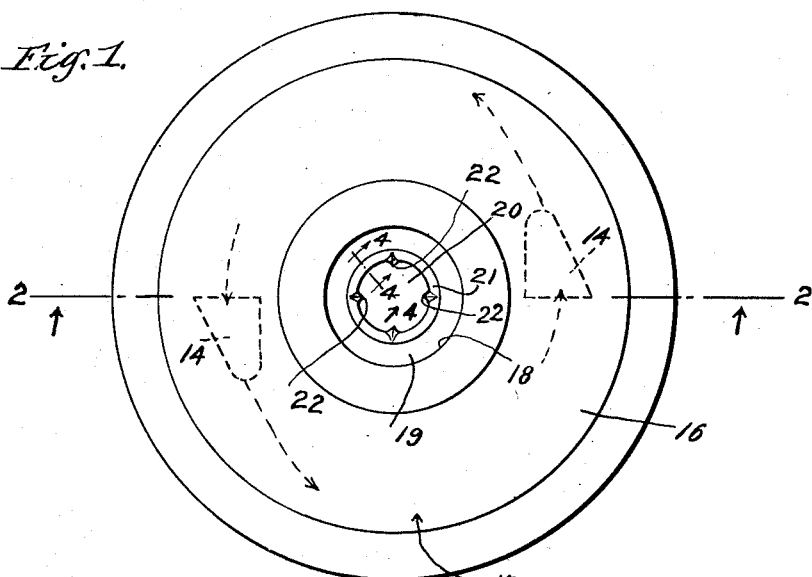
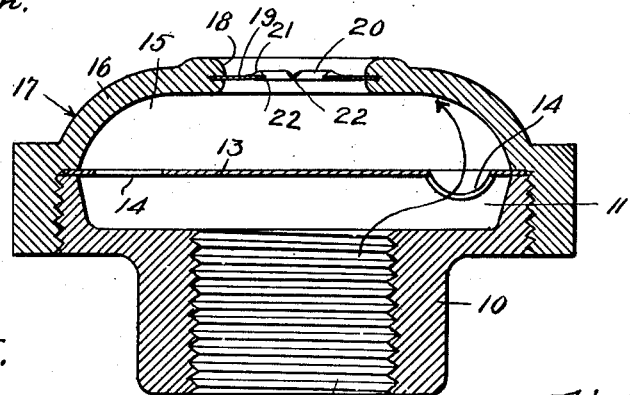
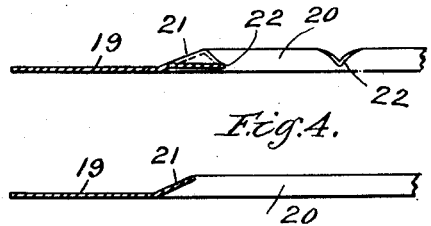
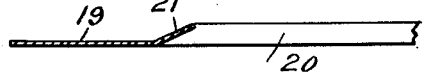
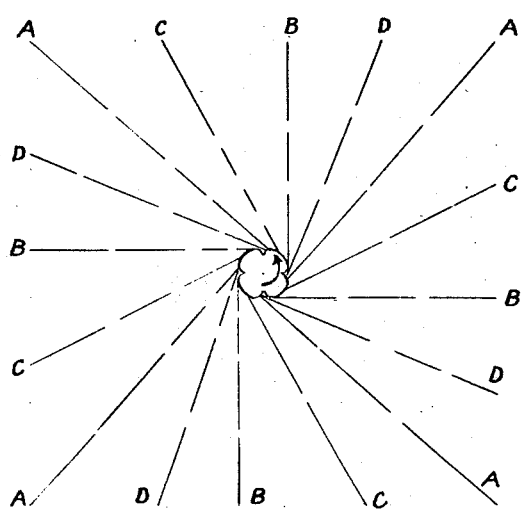
Inventor
John D. Ross
by
Edward A. Thacher
atty.

Patented Apr. 21, 1925.

1,534,546

UNITED STATES PATENT OFFICE.

JOHN D. ROSS, OF PASADENA, CALIFORNIA.

SPRINKLER HEAD.

Application filed July 11, 1922. Serial No. 574,126.

*To all whom it may concern:*

Be it known that I, JOHN D. ROSS, a citizen of the United States, residing at Pasadena, in the county of Los Angeles and State of California, have invented new and useful Improvements in Sprinkler Heads, of which the following is a specification.

My invention relates to sprinkler heads, especially adapted to be used in connection with a piping system, for sprinkling lawns.

In lawn sprinkling systems there are a variety of styles of sprinkler heads now commonly used for spraying the water over the lawn, the best known and most efficient of which being adapted to spray the water in such manner as to cover a circular area of the lawn. When this variety of head is used it is necessary to install the heads in staggered relation and in such manner as to provide for a considerable overlapping of the spray in order to properly cover the lawn, which necessitates the placing of the heads closer together and the employment of more of them than if the spray was so arranged as to cover a square or rectangular area; moreover, by the use of sprays covering a circular area, it is impossible to so place them as to cover the lawn in an even manner, as it will be evident that the sprays of adjacent heads will overlap in an uneven manner, more water being delivered in some spots than in others.

It is the purpose of my present invention to provide a sprinkler head which will efficiently deliver a uniform spray of water over a rectangular or square area of the lawn, thus overcoming the above mentioned difficulties experienced when a circular sprinkler is used, and in addition, providing for the distribution of the water in a straight line along the edges of the lawn, thus preventing the water from being sprayed upon the sidewalks and becoming wasted.

Other objects of my invention will be more fully disclosed in the following specification, reference being had to the accompanying drawings, in which:

Fig. 1 is an enlarged plan view of a sprinkler head embodying the features of my invention.

Fig. 2 is a vertical section through the same taken on the line 2—2 of Fig. 1 viewed in the direction indicated by the arrows, Fig. 3 is an enlarged fragmental section through the sprinkler head discharge plate taken on the same line as Fig. 2.

Fig. 4 is a similar view to that of Fig. 3 taken on the line 4—4 of Fig. 1.

Fig. 5 is a diagrammatic view illustrating the manner in which the spray is delivered through the discharge opening.

My invention is adapted to be applied to a sprinkler head of what is known as the centrifugal type, which imparts a whirling motion to the water as it is delivered through the discharge opening, such, for instance, as the well known type illustrated, which comprises the annular member 10 provided with the annular chamber 11 which communicates with the inlet threaded bore 12.

Mounted above the chamber 11 is the disk member 13 provided with the usual water directing passages 14 which admit the water to the chamber 15 formed by the dome shaped walls 16 of a cap member 17 which is adapted to be threaded to the member 10 to clamp the disk member therebetween.

The dome shaped wall 16 is provided with a centrally disposed opening 18 in which is mounted a thin metallic disk 19 provided with a centrally disposed circular aperture 20 the peripheral edge of which is inclined upwardly toward the center, as at 21.

All of the above recited construction pertains to a type of centrifugal sprinkler head, for discharging a circular spray, now in common use, and forms no specific part of my invention.

I have found that by forming four inwardly projecting prongs or obstructions spaced equally apart on the peripheral edge of the circular aperture 20, such as are illustrated at 22, the usual circular spray will be converted into a square spray; and I have also found that these prongs or obstructions may be readily formed by making indents in the upwardly inclined peripheral edge 21 of the aperture 20 with suitable dies as clearly shown in the drawings; it being understood that it is only necessary to form very minute prongs or obstructions on the edge of the discharge aperture to accomplish the desired result.

In the operation of the sprinkler head the water under pressure enters the bore 12, passes into the chamber 11 and from there enters the chamber 15 through the passages 14 with a centrifugal or whirling motion and thence is directed through the discharge aperture 20 in the direction indicated by the arrows.

As the water passes through the aperture 20 it has the tendency to hug the edge thereof with a whirling motion until interrupted by the obstructions 22 which deflect it out from the aperture with great force and consequently throw the spray at these points a longer distance outwardly than at any other position around the peripheral edge. The sprays at these points are shown at —A— in the diagram Fig. 5, and constitute the corners of the square area to be covered. As it takes a certain amount of time for the whirling water to overcome the inertia caused by its sudden interruption, it follows that the spray delivered through the aperture just behind the obstruction will have the least speed and consequently will be thrown outwardly the shortest distance. These sprays are projected outwardly approximately midway between the corners of the rectangle to form a portion of the sides thereof as shown at —B—. The intermediate sprays —C— will progressively increase in length as the flow of water increases in velocity and the intermediate sprays —D— will decrease in length as the flow of the water decreases in velocity, consequently the sides of the rectangle will be filled out, the obstructions 22 being so shaped as to aid in the obtaining of this result.

What I claim is:

1. A centrifugal sprinkler head comprising a hollow body member provided with a fluid inlet port leading to its hollow interior and with a substantially circular outlet port in its top wall having two pairs of downwardly projecting prongs extending inwardly toward said hollow interior and formed on its edge, the said prongs being spaced equidistant from each other.

2. A sprinkler head, comprising a hollow cast metal body member provided with a fluid inlet leading to its hollow interior and having an outlet opening formed in its top wall, a thin metal plate provided with a substantially circular opening rigidly secured in said first named opening, the edge of said circular opening being provided with two pairs of prongs extending inwardly toward said hollow interior, and said prongs being spaced at a distance from each other approximately ninety degrees on the circumference of said circular opening and the prongs of each pair being separated from each other by an arc of approximately one hundred eighty degrees.

In witness that I claim the foregoing I have hereunto subscribed my name this 16th day of June, 1922.

JOHN D. ROSS.